(12) United States Patent
Togashi et al.

(10) Patent No.: US 7,327,522 B2
(45) Date of Patent: Feb. 5, 2008

(54) OPTICAL LENS AND METHOD OF MANUFACTURING THE SAME

(75) Inventors: Masatoshi Togashi, Tokyo (JP); Hisashi Murata, Tokyo (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 11/181,575

(22) Filed: Jul. 14, 2005

(65) Prior Publication Data

US 2006/0018028 A1    Jan. 26, 2006

(30) Foreign Application Priority Data

Jul. 22, 2004  (JP)  ............................. 2004-213886
May 11, 2005  (JP)  ............................. 2005-138724

(51) Int. Cl.
*G02B 3/00*     (2006.01)
*G02B 27/10*   (2006.01)

(52) U.S. Cl. ...................................... 359/642; 359/626
(58) Field of Classification Search ................ 359/642, 359/668, 819, 811, 821, 822, 808, 619, 626
See application file for complete search history.

(56) References Cited

U.S. PATENT DOCUMENTS 3,912,400 A * 10/1975 Luebkeman ................ 356/247
5,716,540 A * 2/1998 Matiacio et al. ............. 249/117
5,850,276 A 12/1998 Ochi et al. .................. 349/158
5,905,599 A * 5/1999 Nomura et al. ............. 359/819
6,055,111 A 4/2000 Nomura et al. ............. 359/642
6,437,928 B2 * 8/2002 Togashi ...................... 359/811
6,717,735 B2 * 4/2004 Smith ......................... 359/626
2004/0228011 A1 * 11/2004 Yokota et al. ............... 359/811

FOREIGN PATENT DOCUMENTS

| EP | 1 001 301 | 5/2000 |
| JP | 61258718 | 4/1987 |
| JP | 05096580 | 8/1993 |
| JP | 2002-277705 | 9/2002 |
| JP | 2004029045 | 1/2004 |

* cited by examiner

*Primary Examiner*—M. Hasan
(74) *Attorney, Agent, or Firm*—Brinks Hofer Gilson & Lione

(57) ABSTRACT

In an optical lens including a lens portion having a convex or concave lens surface on each side, each lens surface of the lens portion has a convex portion of a small projection centered on the optical axis thereof, and the convex portion has the height which is approximately less than four times the used wavelength so as not to have an effect on an optical characteristic of the lens portion.

2 Claims, 13 Drawing Sheets

OPTICAL LENS AND METHOD OF MANUFACTURING THE SAME

This application claims the benefit of priority to Japanese Patent Application No. 2004-213886 filed on Jul. 22, 2004 and 2005-138724 filed on May 11, 2005, both herein incorporated by reference.

BACKGROUND OF THE INVENTION

1. Field of the Invention

The present invention relates to an optical lens having a lens surface on each surface and a method of manufacturing the same, and more specifically, to an optical lens that is injection-molded by a mold and that has a convex portion or a concave portion in the center of both lens surfaces and a method of manufacturing the same.

2. Description of the Related Art

As a method of manufacturing an optical lens such as a photographing lens of a camera or an imaging lens of an optical element, an injection-molding method is generally used, which is suitable for mass production at a low cost. In the injection-molding method, upper and lower molds which are formed to correspond to the contour of a desired molded product are arranged to be opposed to each other, a molten material is injected into the space between the upper and lower molds to be cooled and solidified, and then a molding product is formed.

In addition, in order to image an object by use of the formed optical lens, a plurality of optical lens are generally arranged in the direction of the optical axis to constitute a lens system. Since the deviation between the central axes of the respective lenses becomes a cause of reduction in resolution, it is necessary that the respective lenses constituting the lens system should be arranged with high precision. The deviation between the central axes of the lenses can be adjusted by a piezoelectric element which is arranged in each of the lenses to be moved minutely. As such an adjusting method, for example, there is provided a method exemplified in Japanese Unexamined Patent Application Publication No. 2002-277705.

However, in the above-described adjusting method in which an optical lens having a lens shape on each side is used, there is no countermeasure against the case where both lens surfaces are deviated with respect to the central axis to be eccentric with each other due to an arrangement error of the upper and lower molds when the optical lens is molded. In the case of the eccentricity of a single lens, the eccentricity amount of both lens surfaces is measured, and based on the measurement result, the positions of the molds are adjusted. However, in the conventional method of measuring the eccentricity of a single lens, the center of the lens surface is calculated from the contour of the lens and the height of the lens, respectively, and then, the deviation between the centers of both surfaces is measured, which means that the measurement becomes complicated because a three-dimensional measuring machine needs to be used.

In addition, as digital cameras are recently miniaturized and have high resolution, lenses are also required to be miniaturized and have high resolution. Further, a permissible value of an eccentricity amount of a single lens is less than several micrometers. The difference between the virtual center calculated by the above-described method and the actual optical center easily occurs. In particular, in the case of an injection-molded optical lens, the contour of the lens is easily distorted due to the flow of injected resin, so that an eccentricity amount is hardly measured and adjusted with high precision.

SUMMARY OF THE INVENTION

The present invention has been made in view of the above problems. It is therefore an object of the present invention to provide an optical lens which is molded by a mold and by which an amount of eccentricity between both lens surfaces can be measured and adjusted precisely with a simple method and a method of manufacturing the optical lens.

According to an aspect of the present invention, an optical lens includes a lens portion having a convex or concave lens surface on each side. Each lens surface of the lens portion has a convex portion constituted by a small projection centered on the optical axis thereof, and the convex portion has the height which is approximately less than four times the used wavelength so as not to have an effect on an optical characteristic of the lens portion.

According to another aspect of the present invention, an optical lens includes a lens portion having a convex or concave lens surface on each side. Each lens surface of the lens portion has a concave portion of a small hole centered on the optical axis thereof, the concave portion is formed in a substantially cylindrical shape or a substantially conical shape, and the diameter of the base is in the range of 0.5 to 5 µm.

According to still another aspect of the optical lens according to the invention, the convex portion is formed in a cross shape and the intersection of the cross shape is arranged on the optical axis of the lens surface.

According to still another aspect of the optical lens according to the invention, each lens surface of the lens portion has a concentric stepped portion centered on the concave portion or the convex portion in the vicinity of the concave portion or the convex portion.

According to still another aspect of the optical lens according to the invention, each lens surface of the lens portion has an orientation concave portion or an orientation convex portion at the position where both lens surfaces are opposed to each other in the vicinity of the concave portion or the convex portion.

According to still another aspect of the optical lens according to the invention, a plate-like edge portion is formed on the circumferential edge of the lens portion and, on both surfaces of the edge portion, a plurality of circumferential-edge convex portions are formed at the position corresponding thereto.

According to still another aspect of the invention, a method of manufacturing an optical lens, which is formed by upper and lower molds and includes a lens portion having a convex lens surface or a concave lens surface on each side, includes forming a lens surface molding portion which is constituted by a convex surface or a concave surface corresponding to the lens surface in each of the upper and lower molds and simultaneously, forming a small hole, which has the depth which is less than four times the used wavelength of the lens portion, the small hole being centered on the position corresponding to the optical axis of the lens surface; injection-molding the lens portion by use of the upper and lower molds on which the lens surface molding portion is formed; and based on the positional deviation between the respective convex portions formed on each lens surface by the small hole, adjusting the relative position between the upper and lower molds.

According to still another aspect of the invention, a method of manufacturing an optical lens, which is formed by upper and lower molds and includes a lens portion having a convex lens surface or a concave lens surface on each side, includes forming a lens surface molding portion which is constituted by a convex surface or a concave surface corresponding to the lens surface in each of the upper and lower molds and which has a small projection having a substantially cylindrical shape or substantially conical shape of which the base has the diameter in a range of 0.5 to 5 μm, the small projection being centered on the position corresponding to the optical axis of the lens surface; injection-molding the lens portion by use of the upper and lower molds on which the lens surface molding portion is formed; and based on the positional deviation between the respective concave portions formed on each lens surface by the small projection, adjusting the relative position between the upper and lower molds.

DESCRIPTION OF THE PREFERRED EMBODIMENT

Figure 1:
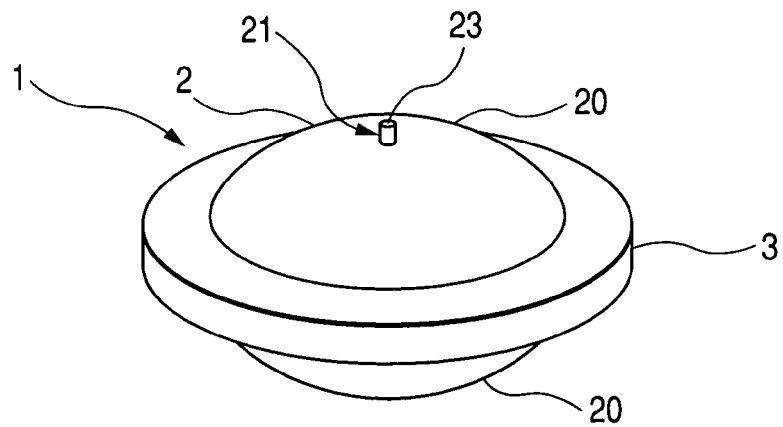
FIG. 1 is a perspective view illustrating an optical lens in the present embodiment.
Figure 2:
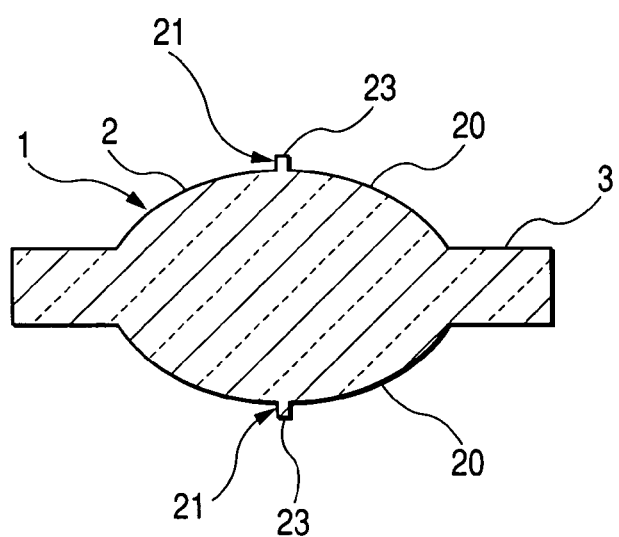
FIG. 2 is a vertical sectional view of FIG. 1.

Preferred embodiments of the present invention will now be described in detail with reference to the drawings. FIG. 1 is a perspective view of an optical lens 1 in the present embodiment, and FIG. 2 is a vertical sectional view of FIG. 1. As shown in FIGS. 1 and 2, the optical lens 1 in the present embodiment, which is used in an optical apparatus such as a camera, includes a lens portion 2 having a convex lens surface 20 on each side and a plate-like edge portion 3 which is formed at the circumferential edge of the lens portion 2.

The lens portion 2, having the convex lens surfaces 20 on each side, refracts and transmits light. In addition, the edge portion 3 is formed at the circumferential edge of the lens portion 2 to be incorporated with the lens portion 2. The edge portion 3 is mounted on a lens holder of an optical apparatus or the like to fix the lens portion at a predetermined position.

Both of the lens surfaces 20 of the lens portion 2 have a rotation-symmetry shape centered on a top portion 21. The lens portion 2 has a convex portion 23 of a small projection on each of the top portions 21 of the lens surfaces 20. That is, the convex portion 23 is formed on the optical axis of the lens surface 20. Here, the respective convex portions 23 have the height which is approximately less than four times a used wavelength so as not to have an effect on an optical characteristic of the lens portion 2. If the height is less than 5 μm, the convex portion 23 hardly has an effect on an optical characteristic of the lens portion 2. The wavelength of visible light is in the range of 0.4 to 0.7 μm. When the used wavelength is set to 0.55 μm which is the intermediate value of the above range, and even though the used wavelength is quadrupled, the value is about 2 μm. Therefore, the formed convex portion 23 does not have an effect on an optical characteristic of the lens portion 2. Moreover, as a practical matter, the respective convex portions 23 shown in FIGS. 1 and 2 are sufficiently small with respect to the lens surface 20 so as not to have an effect on an optical characteristic of the lens portion 2, but they are enlarged in the drawings for convenience of the description in the present embodiment.

Since each of the convex portions 23 is disposed in the rotation center of the lens portion 20, the positional deviation between the respective convex portions 23 with respect to the direction of the central axis is the deviation between the optical axes of both the lens surfaces 20, that is, the eccentricity. Here, the positional deviation between the respective convex portions 23 is obtained by the two-dimensional measurement with respect to the direction of the central axis by a microscope. Since the amount of eccentricity between the lens surfaces 20 can be obtained by measuring the positional deviation between the respective convex portions 23, the amount of eccentricity can be easily measured and the manufacturing cost can be reduced, compared to the conventional example.

Figure 3:
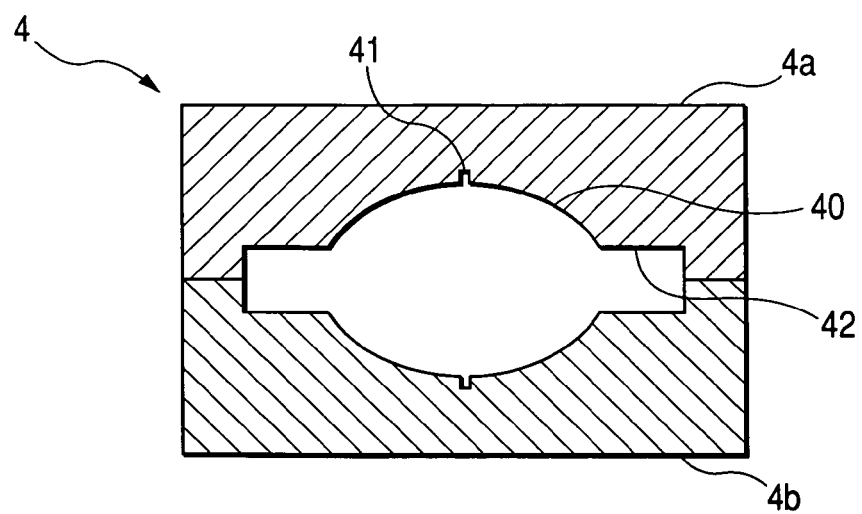
FIG. 3 is a vertical sectional view illustrating upper and lower molds for forming the optical lens in the present embodiment.

The optical lens 1 in the present embodiment is formed by the following method. As shown in FIG. 3, upper and lower molds 4, which are formed so as to correspond to the contour of the optical lens 1, are arranged to be opposed to each other, and then a molten material is injected into the space between the upper and lower molds to be cooled and solidified, which is referred to as the injection molding method. Here, the upper and lower molds 4 are generally made of a steel material, because they need to be rigid enough not to be deformed by a pressing force when a material is injected into the space. In addition, there is a case where a copper alloy or an aluminum alloy is used for increasing cooling efficiency.

Figure 4:
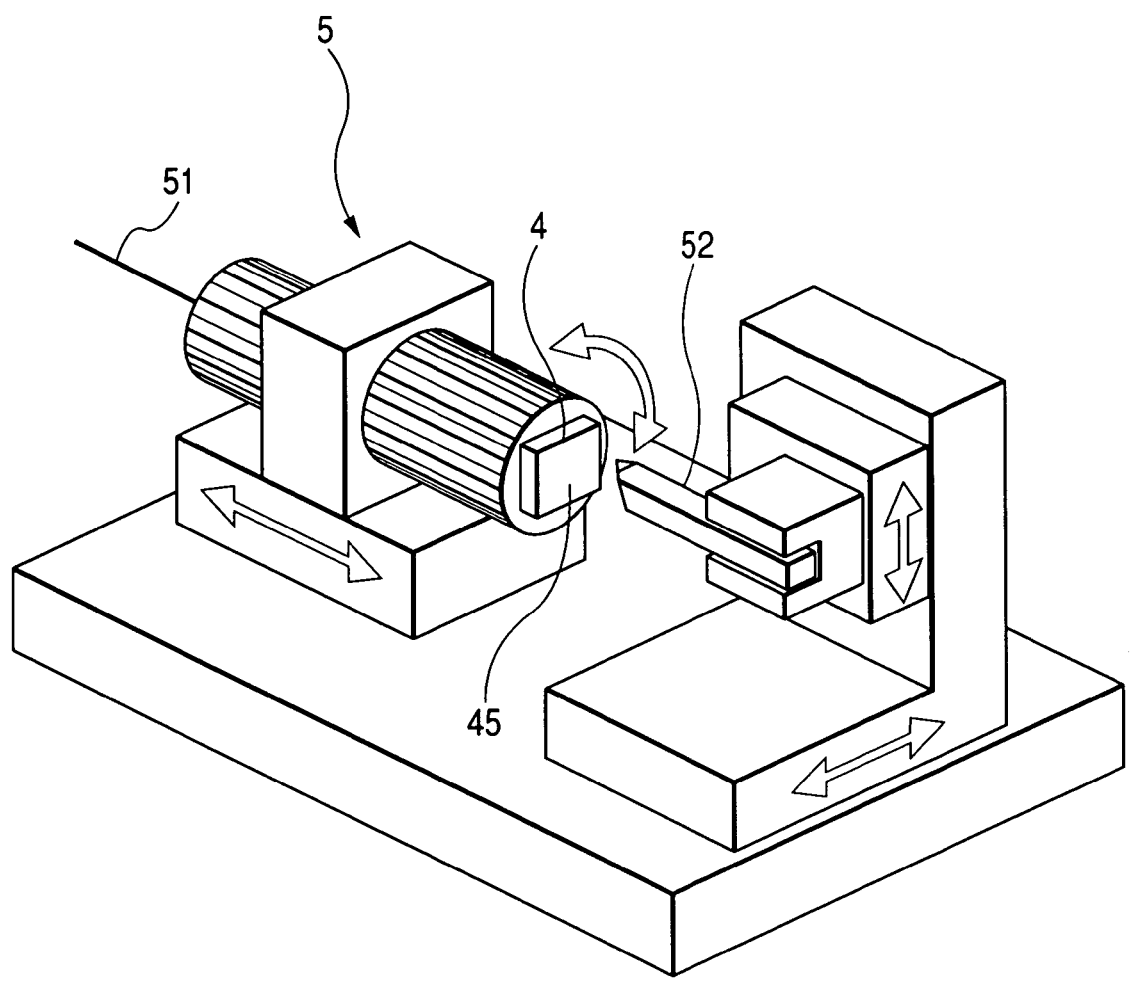
FIG. 4 is a schematic view illustrating a mold forming apparatus.

The upper and lower molds 4 are formed by cutting work. FIG. 4 is a schematic diagram illustrating a mold forming apparatus. In order to form each mold 4, first, the mold 4 is held so that a surface 45 to be cut is orthogonal to a rotation shaft 51 of a lathe 5. Then, the mold 4 is rotated by the rotation of the rotation shaft 51 of the lathe 5. Further, a bite which is a cutting tool 52 is arranged in the direction perpendicular to the surface 45 to be cut and cuts in the surface 45 to be cut while moving. Then, the mold 4 is formed in a predetermined shape.

Figure 5A:
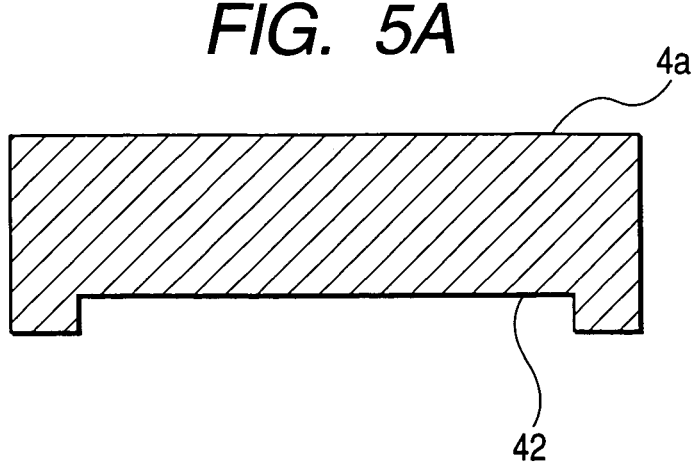
FIG. 5 is a vertical sectional view illustrating the forming processes (A to C) of the upper and lower molds in the present embodiment.
Figure 5B:
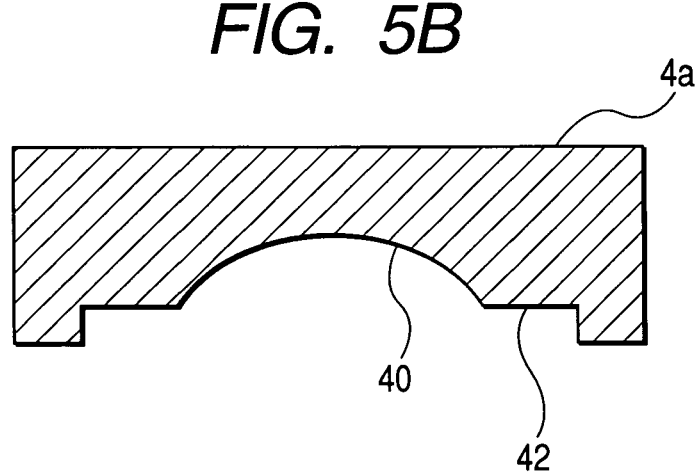
Figure 5C:
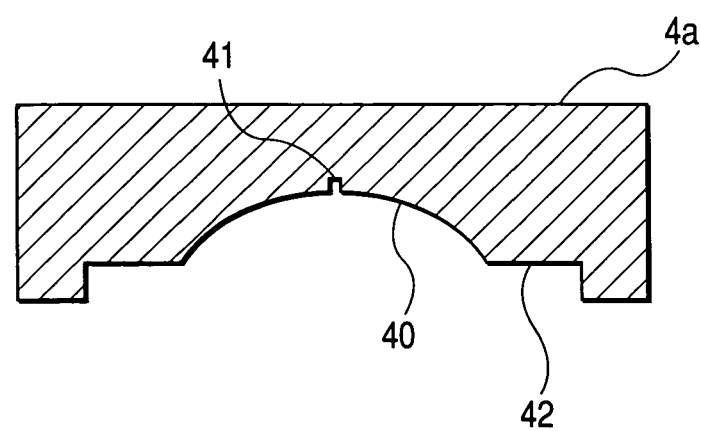

Here, a method of manufacturing the optical lens 1 in the present embodiment will be concretely described. To begin with, among the upper and lower molds 4 for forming the optical lens 1 in the present embodiment, a method of forming the upper mold 4a will be described. FIG. 5 is a sectional view illustrating the forming process of the upper mold 4a. First, on the surface 45 to be cut, a circumferential edge molding portion 42 corresponding to the plate-like edge portion 3 which is formed at the circumferential edge of the lens portion 2 is formed (FIG. 5A). Next, a lens surface molding portion 40 is formed, which corresponds to the lens portion 20 and is formed with a concave surface (FIG. 5B). Then, in the center of the lens surface molding portion 40 corresponding to the rotation center of the lens surface 20, a small hole 41 is formed, having the depth which is approximately less than four times the used wavelength of the lens portion 2 (FIG. 5C). After the lens surface molding portion 40 is formed, the formation of the small hole 41 is continuously performed. Therefore, in a state where the center of the lens surface molding portion 40 formed on the upper mold 4a is precisely aligned with the cutting tool 52, the small hole 41 can be formed. As described above, the upper mold 4a is formed.

Similarly, by performing the same operation as the above-described operation for the lower mold 4a. the upper and lower molds 4 are formed. By injection molding by use of the formed upper and lower molds 4, the optical lens 1 is formed, which has the convex portion 23 of a small projection formed on each of the top portions 21 of both lens surfaces 20 constituted by a convex surface. Here, since each of the convex portions 23 is formed to correspond to the small hole 41 which are precisely formed in the center of the lens surface molding portion 40, the respective convex portions 23 are precisely formed in the top portions 21 of both lens surfaces 20.

Figure 6:
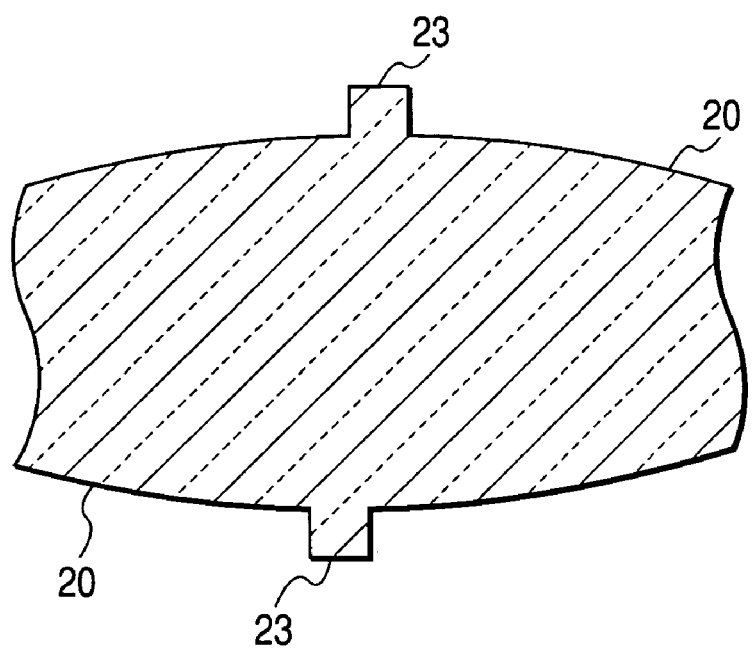
FIG. 6 is an enlarged sectional view illustrating the eccentricity of the lens surface.
Figure 7:
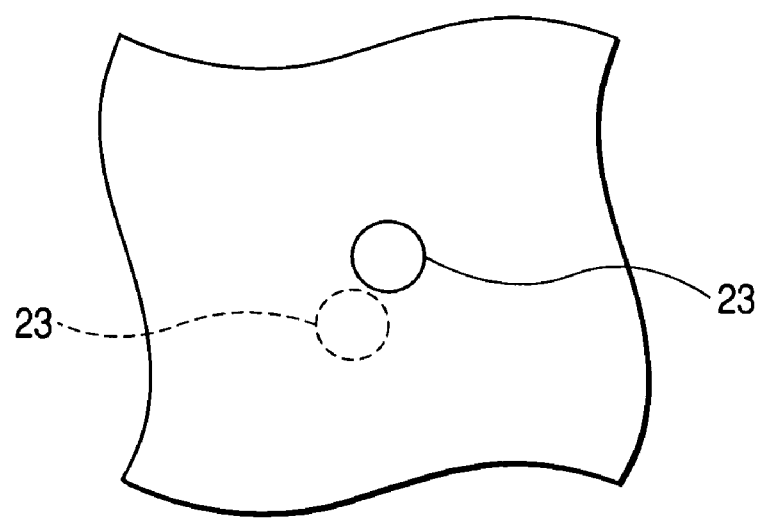
FIG. 7 is an enlarged plan view illustrating the eccentricity of the lens surface.

FIGS. 6 and 7 are a sectional view and a plan view illustrating the eccentricity between both lens surfaces 20, respectively. As shown in FIGS. 6 and 7, even though forming precision of the mold 4 is sufficiently ensured, both lens surfaces 20 are subject to be eccentric due to an arrangement error or the like when the upper and lower molds 4 are arranged to be opposed to each other. Here, the respective convex portions 23 are arranged on the optical axis of both lens surfaces 20. Therefore, by measuring the positional deviation between the respective convex portions 23 with respect to the direction of the optical axis and adjusting the relative position between the upper and lower molds in the horizontal direction based on the measurement result, the optical lens 1 having no eccentricity can be formed.

Figure 8:
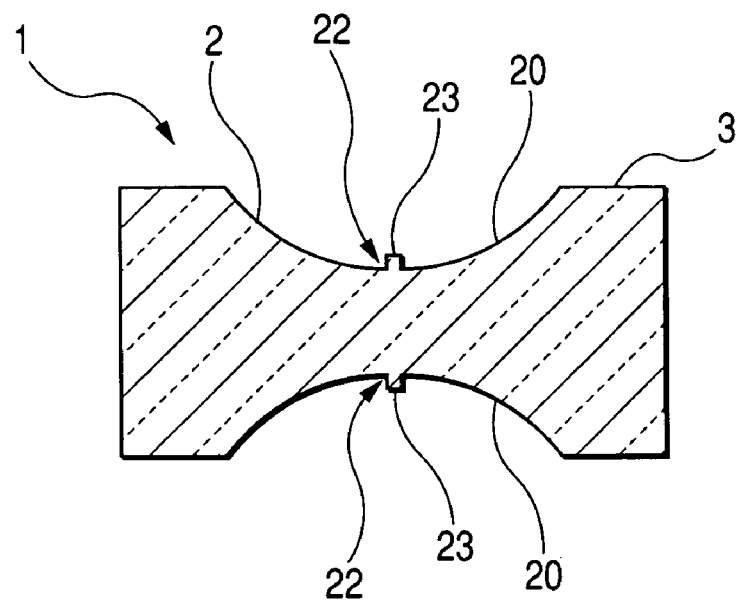
FIG. 8 is a vertical sectional view illustrating an optical lens in the second embodiment.

Next, the second embodiment will be described. As shown in FIG. 8, an optical lens 1 in the present embodiment includes a lens portion 2 having a concave lens surface 20 on each side and a plate-like edge portion 3 which is formed at the circumferential edge of the lens portion 2.

The lens portion 2, which is a single lens having the concave lens surface 20 on each side, refracts and transmits light. In addition, the edge portion 3 is formed at the circumferential edge of the lens portion 2 to be incorporated with the lens portion 2. Further, the edge portion 3 is mounted on a lens holder of an optical apparatus or the like to fix the lens portion 2 at a predetermined position.

Both lens surfaces 20 and 20 of the lens portion 2 have a rotation-symmetry shape centered on a bottom portion 22, on which the convex portion 23 of a small projection is provided. That is, the convex portion 23 is formed on the optical axis of the lens surface 20. Here, each of the convex portions 23 has the height, which is approximately less than four times the used wavelength, so as not to have an effect on an optical characteristic of the lens portion 2. Here, as a practical matter, the respective convex portions 23 shown in FIG. 8 are sufficiently small with respect to the lens surface 20, but they are enlarged in the drawings for convenience of the description in the present embodiment.

Since each of the convex portions 23 is arranged in the rotation center of the lens surface 20, the positional deviation between the respective convex portions 23 with respect to the direction of the central axis is the deviation between both the optical axes of lens surfaces 20, that is, the eccentricity. Therefore, the same effect as the first embodiment can be obtained.

Figure 9:
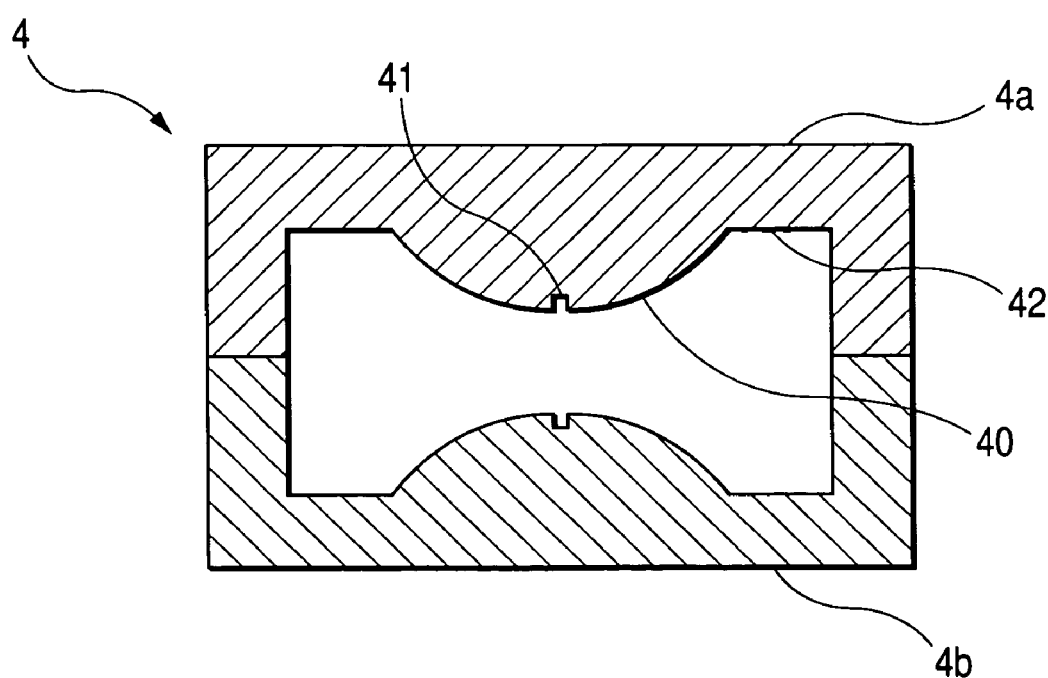
FIG. 9 is a vertical sectional view illustrating upper and lower molds for forming the optical lens in the second embodiment.

As shown in FIG. 9, the optical lens 1 in the present embodiment is formed by injection molding with the upper and lower molds 4 formed to correspond to the contour thereof. In addition, the upper and lower molds 4 are formed by cutting work, similarly to the first embodiment.

Figure 10A:
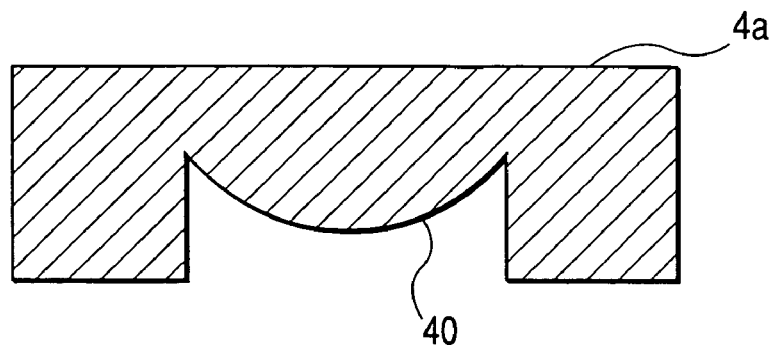
FIG. 10 is a vertical sectional view illustrating the forming processes (A to C) of the upper and lower molds in the second embodiment.
Figure 10B:
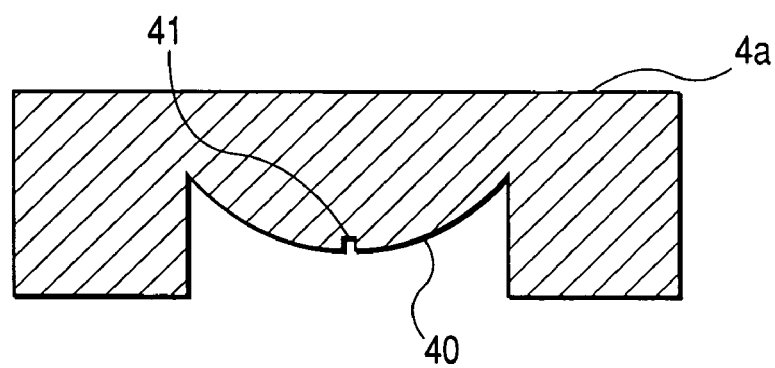
Figure 10C:
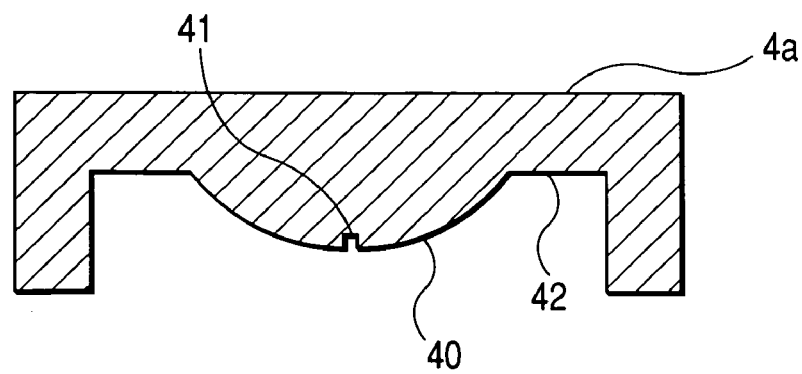

A method of manufacturing the optical lens 1 in the present embodiment will be concretely described. To being with, among the upper and lower molds 4, the formation of the upper mold 4a will be described. FIG. 10 is a sectional view illustrating the forming process of the upper mold 4a. First, the lens surface molding portion 40 constituted by a convex surface corresponding to the lens surface 20 is formed on the surface 45 to be cut (FIG. 10A). Then, in the center of the lens surface molding portion 40 corresponding to the rotation center of the lens surface 20, a small hole 41 is formed, having the depth which is approximately less than four times the used wavelength of the lens portion 2 (FIG. 10B). After the lens surface molding portion 40 is formed, the formation of the small hole 41 is continuously performed. Therefore, in a state where the center of the lens surface molding portion 40 formed on the upper mold 4a is precisely aligned with the cutting tool 52, the small hole 41 can be formed. Next, a circumferential edge molding portion 42 corresponding to the plate-like edge portion 3 which is formed at the circumferential edge of the lens portion 2 is formed (FIG. 1OG). As described above, the upper mold 4a is formed.

Similarly, by performing the same operation as the above operation for the lower mold 4b, the upper and lower molds 4 are formed. By injection molding with the formed upper and lower molds 4, the optical lens 1 is formed, which has the convex portion 23 of a small projection on each of the bottom portions 22 of both lens surfaces 20 which are constituted by a concave surface. Here, since each of the convex portions 23 is formed to correspond to the small hole 41 which are precisely formed in the center of the lens surface molding portion 40, the convex portions 23 are precisely formed on the bottom portions 22 of both lens surfaces 20.

Here, similarly to the first embodiment, the respective convex portions 23 are arranged on the optical axis of both lens surfaces 20. Therefore, even when both lens surfaces 20 are eccentric with each other, the relative position between the upper and lower molds 4 is adjusted in the horizontal direction based on the positional deviation between the respective convex portions 23 with respect to the direction of the optical axis, so that the optical lens 1 having no eccentricity can be formed.

Figure 11:
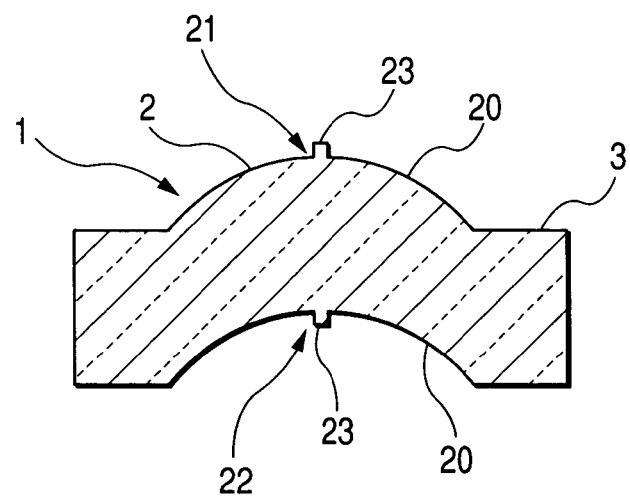
FIG. 11 is a vertical sectional view illustrating an optical lens in the third embodiment.

Next, a third embodiment will be described. As shown in FIG. 11, the optical lens 1 in the present embodiment includes the lens portion 2, of which one side is a convex surface and of which the other side is a concave surface, and the plate-like edge portion 3 which is formed at the circumferential edge of the lens portion 2.

Both lens portions 20 and 20 of the lens portion 2 have a rotation-symmetry shape centered on the top portion 21 and the bottom portion 22, respectively. On the top portion 21 and the bottom portion 22, the convex portion 23 of a small projection is provided. That is, the convex portion 23 is formed on the optical axis of both the lens surfaces 20. Here, similarly to the first or the second embodiment, each of the convex portions 23 has the height, which is approximately less than four times the used wavelength, so as not to have an effect on an optical characteristic of the lens portion 2. Here, as a practical matter, the respective convex portions 23 shown in FIG. 11 are sufficiently small with respect to the lens surface 20, but they are enlarged in the drawings for convenience of the description.

Since each of the convex portions 23 is arranged in the rotation center of the lens surface 20, the positional deviation between the respective convex portions 23 with respect to the central axis is the deviation between optical axes of both the lens surfaces 20, that is, the eccentricity. Therefore, the same effect as the first embodiment or the second embodiment can be obtained.

Figure 12:
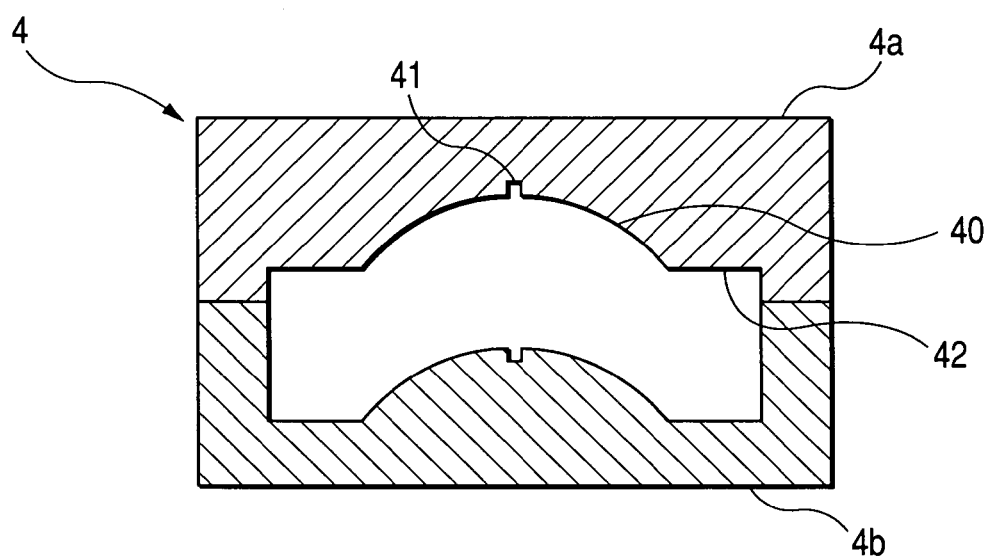
FIG. 12 is a vertical sectional view illustrating upper and lower molds for forming the optical lens in the third embodiment.

As shown in FIG. 12, the optical lens 1 in the present embodiment is formed by injection molding with upper and lower molds 4 formed to correspond to the contour thereof. The upper and lower molds 4 are formed by cutting work, similarly to the first embodiment or the second embodiment. Then, the upper mold 4a by which the lens surface 20 is formed to be convex is formed in the same procedure as that of the first embodiment, and the lower mold 4a by which the lens surface 20 is formed to be concave is formed in the same procedure as that of the second embodiment.

By injection molding with the formed upper and lower molds 4, one side is formed to be a convex surface, and the other side is formed to be a concave surface. In addition, the optical lens 1 having the convex portions 23 on the optical axis of both lens surfaces 20 is formed. Here, similarly to the first embodiment or the second embodiment, the respective convex portions 23 are arranged on the optical axis of both lens surfaces 20. Therefore, even when both lens surfaces 20 are eccentric with each other, the relative position between the upper and lower molds 4 is adjusted in the horizontal direction based on the positional deviation between the respective convex portions 23 with respect to the direction of the optical axis, so that the optical lens 1 having no eccentricity can be formed.

In the first to the third embodiments, the lens surface 20 is formed in a rotation-symmetry shape centered on the top portion 21 and bottom portion 22. However, even when the lens surface 20 is formed in an elliptic shape or an asymmetric shape, and if the convex portions 23 are formed on the optical axis of the lens surface 20, the amount of eccentricity can be easily calculated from the positional deviation between the respective convex portions 23.

Figure 13:
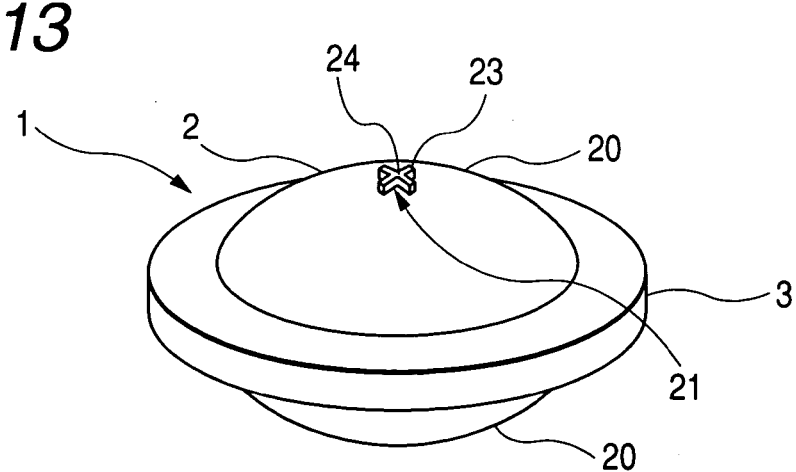
FIG. 13 is a perspective view illustrating an optical lens in the fourth embodiment.

Next, the fourth embodiment will be described. As shown in FIG. 13, the optical lens 1 in the present embodiment includes the convex portion 23 having a cross shape, of which the intersection 24 is arranged on the top portion 21 of the lens surface 20. Similarly, when the shape of the lens surface 20 is concave, the intersection 24 is arranged on the bottom portion 22 of the lens surface 20. When the lens surface 20 is not formed in a rotation-symmetry shape, the intersection 24 is arranged on the optical axis of the lens surface. Here, as a practical matter, the respective convex portions 23 shown in FIG. 13 are sufficiently small with respect to the lens surface 20 so as not to have an effect on an optical characteristic of the lens portion 2, but they are enlarged in the drawings for convenience of the description.

Each of the convex portions 23 is formed to correspond to the small hole 41 formed in the center of the lens surface molding portion 40 of the mold 4. Accordingly, two grooves for the small hole may be formed with the intersection being the center of the lens surface molding portion 40 and manufacture by cutting work is easily performed. In addition, the cross-shaped intersection 24 is arranged on the optical axis of the lens surface 20. Therefore, when the positional deviation between the respective convex portions 23 is measured by use of a microscope, it is easy to specify the positions of both lens surfaces 20 on the optical axis.

Figure 14:
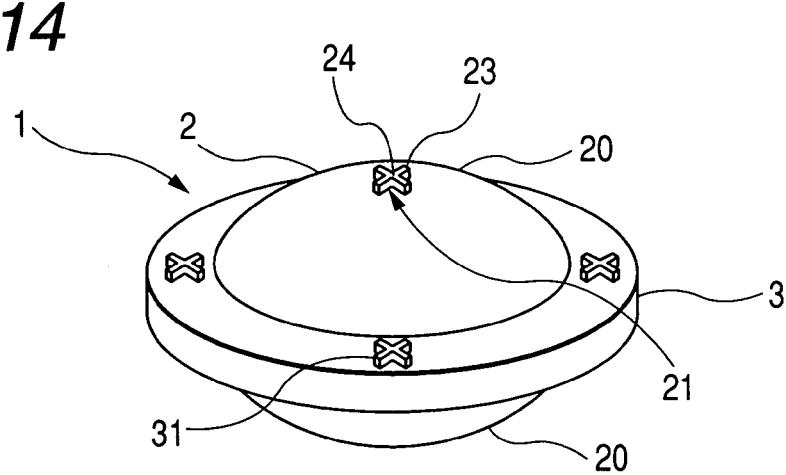
FIG. 14 is a perspective view illustrating an optical lens in the fifth embodiment.

Next, the fifth embodiment will be described. As shown in FIG. 14, the optical lens 1 in the present embodiment is provided with a plurality of circumferential-edge convex portions 31 which are formed at the corresponding positions of both surfaces of the edge portion 3 formed at the circumferential edge of the lens portion 2. Therefore, from the positional deviation between the plurality of circumferential-edge convex portions 31 and 31 corresponding to each other, the positional deviations between the respective convex portions 23 can be calculated. Based on the positional deviation between the respective convex portions 23, the relative position between the upper and lower molds 4 is adjusted, so that the optical lens 1 having no eccentricity is formed. Here, since the surface of the edge portion 3 having the circumferential-edge convex portions 31 is not an optically effective surface, an optical characteristic of the lens portion 2 does not need to be considered when the circumferential-edge convex portions 31 are formed.

Figure 15:
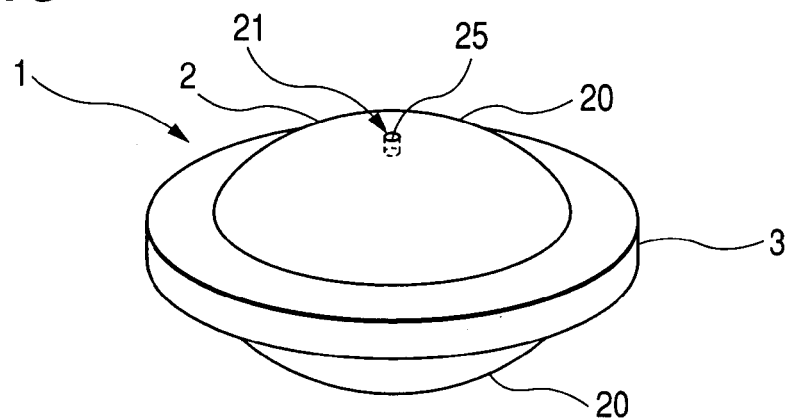
FIG. 15 is a perspective view illustrating an optical lens in the sixth embodiment.

Next, the sixth embodiment will be described. Similarly to the first embodiment, the optical lens 1 in the present embodiment includes the lens portion 2 having the convex lens surfaces 20 on each side and the plate-like edge portion 3 which is formed at the circumferential edge of the lens portion 2. FIG. 15 is a perspective view of the optical lens 1 in the present embodiment, and FIG. 16 is a vertical sectional view of FIG. 15.

Figure 16:
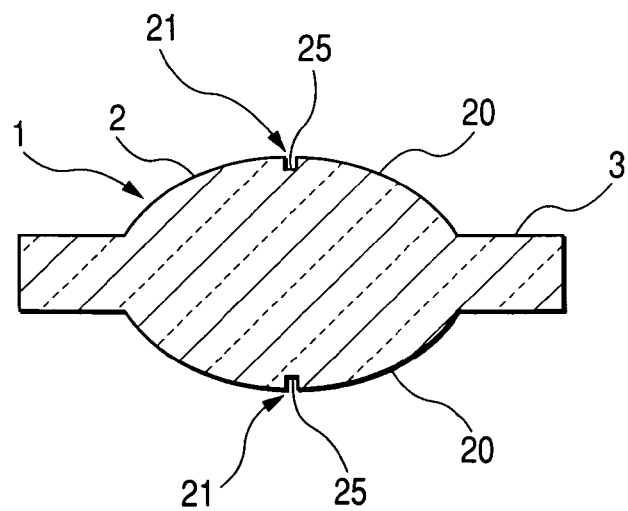
FIG. 16 is a vertical sectional view of FIG. 15.
Figure 17:
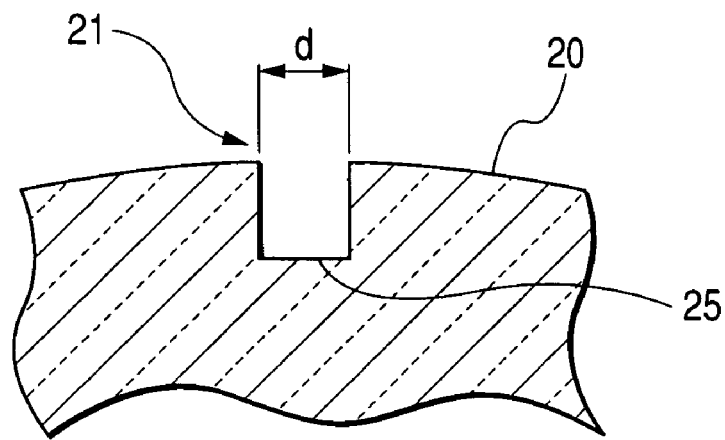
FIG. 17 is an enlarged sectional view of a concave portion.

As shown in FIGS. 15 and 16, on the top portions 21 of both lens surfaces 20 of the optical lens 1 in the present embodiment, concave portions 25 constituted by a small hole are provided, unlike the first embodiment. FIG. 17 is an enlarged sectional view illustrating the concave portion 25.

As shown in FIG. 17, the concave portion 25 formed on the top portion 21 of the lens surface 20 is formed in a substantially cylindrical shape. The diameter of the base which is the opening surface on the lens surface 20 is in the range of 0.5 to 5 μm (0.5 μm<d<5 μm).

Since the respective concave portions 25 are arranged in the rotation center of the lens surface 20, the positional deviation between the concave portions 25 with respect to the direction of the central axis are the deviation between optical axes of both the lens surfaces 20, that is, the eccentricity. The positional deviation between the respective concave portions 25 are obtained by the two-dimensional measurement with respect to the direction of the central axis by a microscope. Specifically, the focus of the microscope is first aligned with the one-side base of the concave portions 25 to be set to the center of the reference coordinate. Then, in a state where the coordinate is aligned, the focus of the microscope is moved to the other-side base of the concave portions 25 and the difference from the center coordinate is measured. That is, the measurement can be easily performed and the manufacturing cost can be reduced, compared to the conventional example.

In addition, as digital cameras are recently miniaturized and have high resolution, lenses are also required to be miniaturized and have high resolution. Further, a permissible value of the eccentricity must be less than several micrometers, and measurement precision of the eccentricity amount is required to be less than 1 μm. In the present embodiment, since the diameter d of the base of each of the concave portions 25 is less than 5 μm, an eccentricity amount can be calculated with high precision in the order of 1 μm. In addition, when the diameter of the concave portion 25 is set to be larger than 0.5 μm, the concave portion 25 can be properly detected by a general microscope.

An amount of eccentricity between both lens surfaces 20 is calculated by using the bases of the respective concave portions 25 as a reference. Therefore, if the diameter of the base of the concave portion 25 is in the range of 0.5 to 5 μm, the shape of the concave portion 25 is not limited to a cylindrical shape. For example, even though the shape is substantially conical, the eccentricity measurement can be performed with ease and with high precision.

In the present embodiment, in a state where the diameter of the base of the concave portion 25 is set to be in the range of 1 to 2 μm, the depth thereof is set to about 0.5 μm, and magnifications of the microscope are set to 500. an eccentricity amount is measured, which proves that the eccentricity measurement can be performed with repeated-measurement precision of 0.2 μm and minute eccentricity more or less than 2 μm can be calculated extremely correctly.

Figure 18:
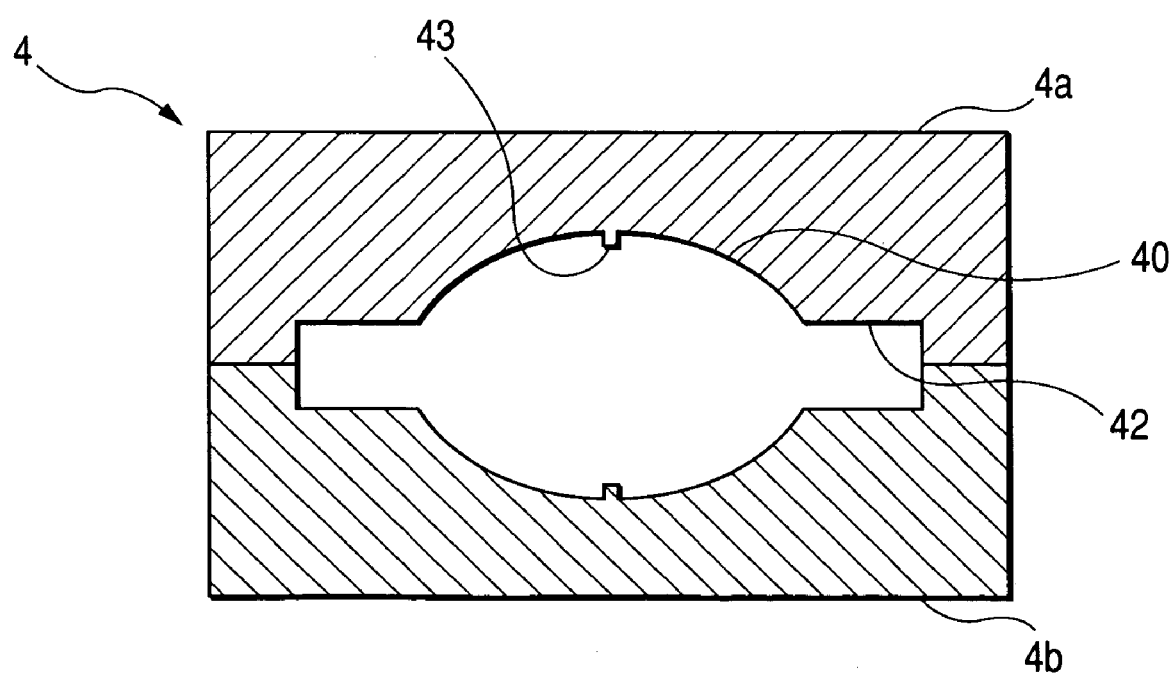
FIG. 18 is a vertical sectional view illustrating upper and lower molds for forming the optical lens in the sixth embodiment.

As shown in FIG. 18, the optical lens 1 in the present embodiment is formed by injection molding by use of the upper and lower molds 4 formed to correspond to the contour thereof. In addition, the upper and lower molds 4 are formed by cutting work, similarly to the first embodiment.

Figure 19A:
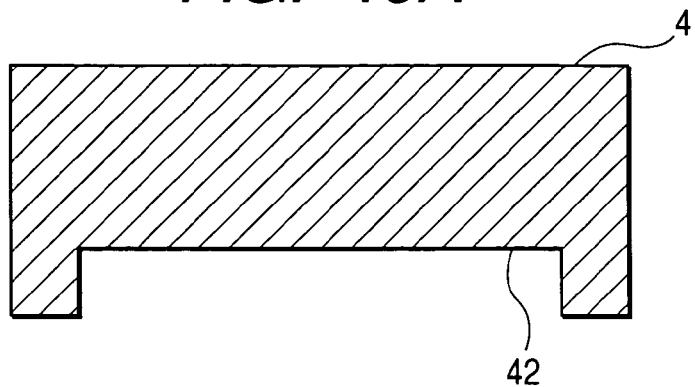
FIG. 19 is a vertical sectional view illustrating the forming processes (A to B) of the upper and lower molds in the sixth embodiment.
Figure 19B:
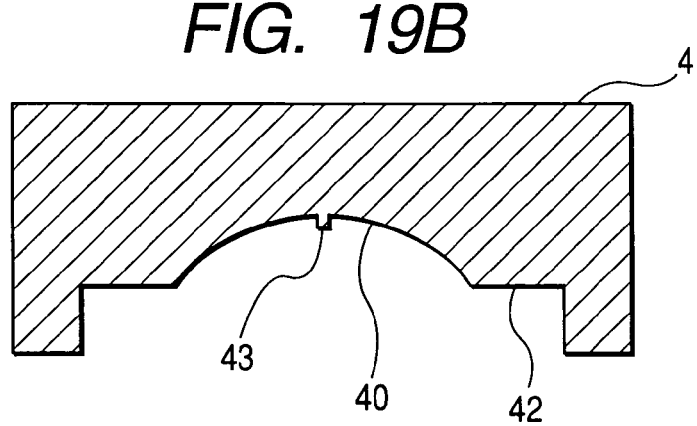

Here, a method of manufacturing the optical lens 1 in the present embodiment will be concretely described. To begin with, among the upper and lower molds 4 forming the optical lens 1 in the present embodiment, the formation of the upper mold 4a will be described. FIG. 19 is a sectional view illustrating the forming process of the upper mold 4a. First, the circumferential-edge molding portion 42 corresponding to the plate-like edge portion 3 which is formed at the circumferential edge of the lens portion 2 is formed on the surface 45 to be cut (FIG. 19A). Next, the concave lens surface molding portion 40 corresponding to the lens surface 20 is formed (FIG. 19B). At this time, in the center of the concave surface corresponding to the rotation center of the lens surface 20, the lens surface molding portion 40 is formed so that a small projection 43 whose diameter is in the range of 0.5 to 5 μm is provided on the concave surface. That is, when the concave surface corresponding to the lens surface 20 is formed by cutting work, the lens surface molding portion 40 is formed so that the portion corresponding to the concave portion 25 is left. Therefore, in a state where the center of the lens surface molding portion 40 is precisely aligned with the cutting tool 52, the small projection 43 can be formed. As described above, the upper mold 4a is formed.

Similarly, by performing the same operation as the above-described operation for the lower mold 4a. the upper and lower molds 4 are formed. By injection molding by use of the formed upper and lower molds 4, the optical lens 1 is formed, which has the concave portion 25 of a small hole on each of the top portions 21 of both lens surfaces 20 constituted by a convex surface. Here, since each of the concave portions 25 are formed to correspond to the small projection 43 which is precisely formed in the center of the lens surface molding portion 40, the concave portion 25 is precisely formed on each of the top portions 21 of both lens surfaces 20.

The respective concave portions 25 are precisely arranged in the rotation center which is the optical axis of both lens surfaces 20, and the diameter of the base in the lens surface 20 is formed to be in the range of 0.5 to 5 μm. Therefore, the eccentricity between both lens surfaces 20 can be measured with ease and with high precision by a microscope. Further, as the relative position between the upper and lower molds 4 is adjusted in the horizontal direction based on the measurement result, the optical lens 1 which satisfies a permissible value of the eccentricity can be formed.

Figure 20:
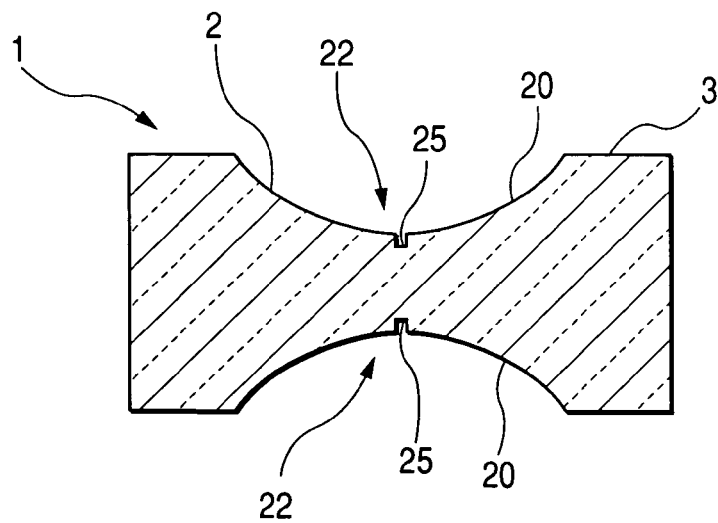
FIG. 20 is a vertical sectional view illustrating an optical lens in the seventh embodiment.

Next, the seventh embodiment will be described. As shown in FIG. 20, the optical lens 1 in the present embodiment includes the lens portion 2 having the concave lens surfaces 20 on each side and the plate-like edge portion 3 which is formed at the circumferential edge of the lens portion 2. Further, the concave portion 25 is formed in each of the bottom portions 22 which is on the optical axis of the lens surface 20.

The concave portion 25 which is formed on each lens surface 20 is the same as the concave portion 25 in the sixth embodiment, and the diameter of the base which is the opening surface on the lens surface 20 is in the range of 0.5 to 5 μm. That is, the positional deviation between the respective concave portions 25 arranged on the optical axis of the lens surface 20 is the eccentricity between both lens surfaces 20, and the same effect as the sixth embodiment can be obtained.

Figure 21:
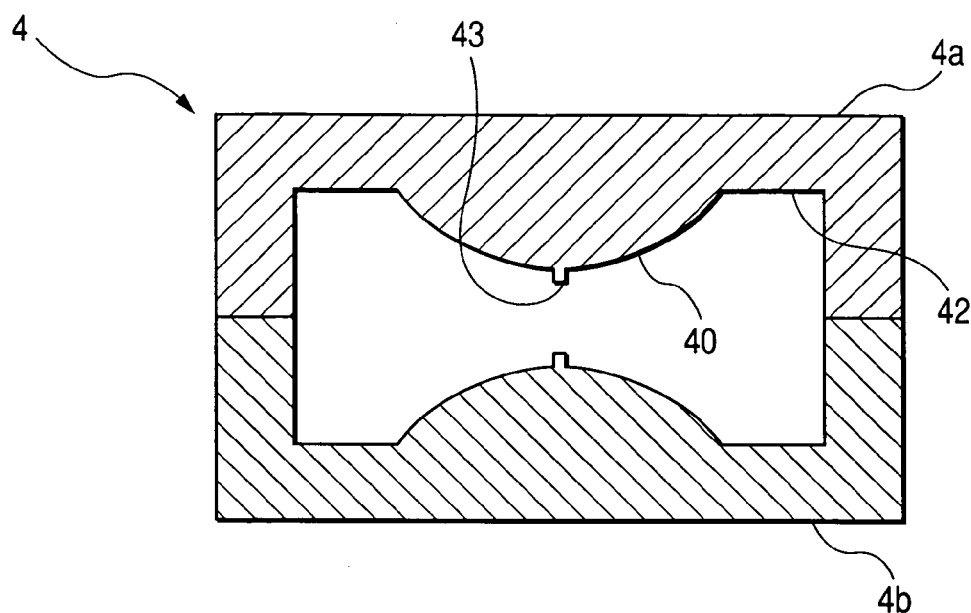
FIG. 21 is a vertical sectional view illustrating upper and lower molds for forming the optical lens in the seventh embodiment.

As shown in FIG. 21, the optical lens 1 in the present embodiment is formed by injection molding by use of the upper and lower molds 4 formed to correspond to the contour thereof. In addition, the upper and lower molds 4 are formed by cutting work, similarly to the sixth embodiment.

Figure 22A:
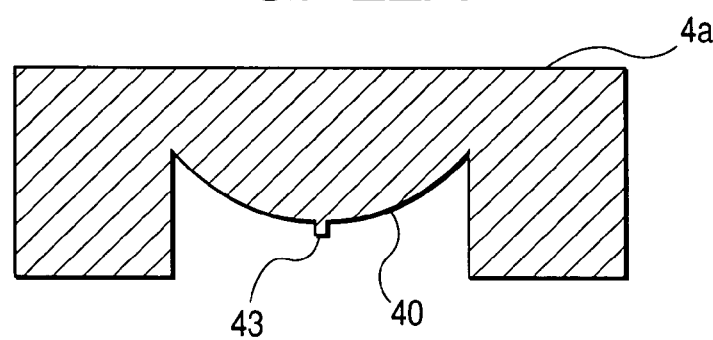
FIG. 22 is a vertical sectional view illustrating the forming processes (A to B) of the upper and lower molds in the seventh embodiment.
Figure 22B:
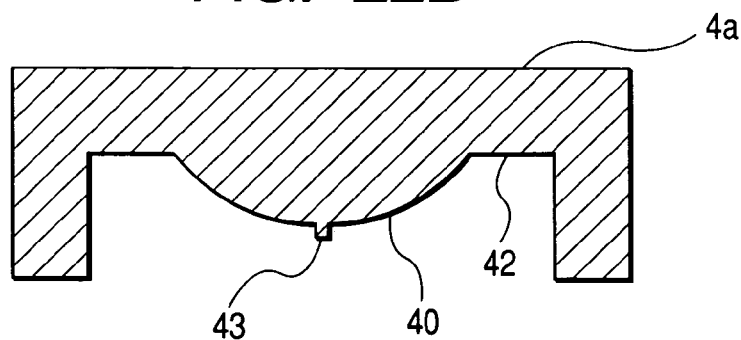

A method of manufacturing the optical lens 1 in the present embodiment will be concretely described. To begin with, among the upper and lower molds 4, the formation of the upper mold 4a will be described. FIG. 22 is a sectional view illustrating the forming process of the upper mold 4a. First, the convex lens surface molding portion 40 corresponding to the lens surface 20 is formed (FIG. 22A). At this time, in the center of the convex surface corresponding to the rotation center of the lens surface 20, the lensles surface molding portion 40 is formed so that the small projection 43 whose diameter is in the range of 0.5 to 5 µm is provided in the convex surface. That is, when the convex surface corresponding to the lens surface 20 is formed by culling work, the lens surface molding portion 40 is formed so that the portion corresponding to the concave portion 25 is left. Therefore, in a state where the center of the lens surface molding portion 40 is precisely aligned with the cutting tool 52, the small projection 43 can be formed. Next, the circumferential-edge molding portion 42 corresponding to the plate-like edge portion 3 which is formed at the circumferential edge of the lens portion 2 is formed (FIG. 22B). As described above, the upper mold 4a is formed.

By performing the same operation as the above-described operation for the lower mold 4b. the upper and lower molds 4 are formed. By injection molding by use of the formed upper and lower molds, the optical lens 1 is formed, which includes the concave portion 25 of a small hole on each of the bottom portions 22 of both lens surfaces 20 which are constituted by a concave surface. Here, since each of the concave portions 25 is formed to correspond to the small projection 43 which is precisely formed in the center of the lens surface molding portion 40, the concave portion 25 is precisely formed in each of the bottom portions 22 of both lens surfaces 20.

The respective concave portions 25 are precisely arranged on the rotation center which is the optical axis of both lens surfaces 20, and the diameter of the base in the lens surface 20 is in the range of 0.5 to 5 µm. Therefore, the eccentricity between both lens surfaces 20 can be measured with ease and with high precision by a microscope. Further, as the relative position between the upper and lower molds 4 is adjusted in the horizontal direction based on the measurement result, the optical lens 1 which satisfies a permissible value of the eccentricity can be formed.

Figure 23:
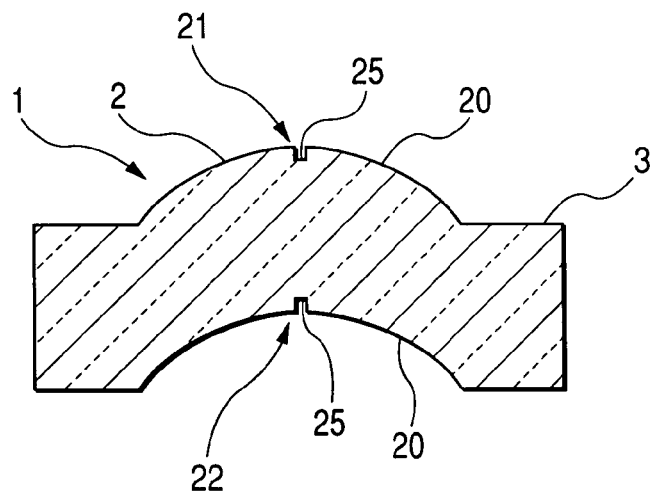
FIG. 23 is a vertical sectional view illustrating an optical lens in the eighth embodiment.

The eighth embodiment will be described. As shown in FIG. 23, the optical lens 1 in the present embodiment includes the lens portion 2 of which one side is a convex surface and of which the other side is a concave surface and the plate-like edge portion 3 which is formed at the circumferential edge of the lens portion 2. Further, both lens surfaces 20 of the lens portion 2 are formed to have a rotation-symmetry shape centered on the top portion 21 and the bottom portion 22, respectively. On each of the top portion 21 and the bottom portion 22, the concave portion 25 of a small hole is provided.

The concave portion 25 formed on each lens surface 20 is the same as the concave portion 25 in the seventh embodiment or the seventh embodiment, and the diameter of the base which is the opening surface on the lens surface 20 is in the range of 0.5 to 5 µm. That is, the positional deviation between the respective concave portions 25 arranged on the optical axis of the lens surface 20 is the eccentricity between both lens surfaces 20, and the same effect as the sixth embodiment or the seventh embodiment can be obtained.

Figure 24:
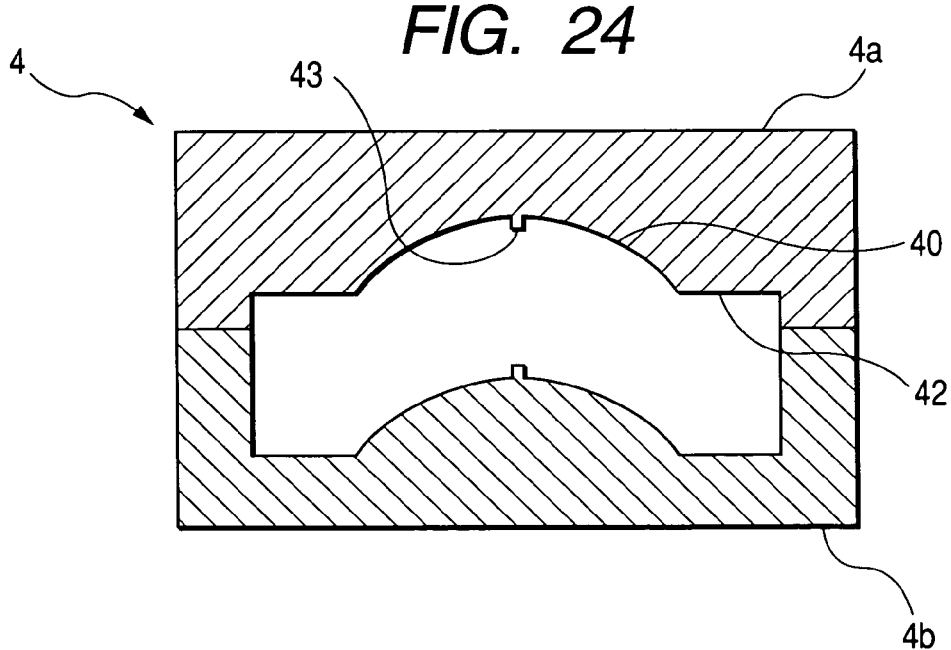
FIG. 24 is a vertical sectional view illustrating upper and lower molds for forming the optical lens in the eighth embodiment.

As shown in FIG. 24, the optical lens 1 in the present embodiment is formed by injection molding by use of the upper and lower molds 4 formed to corresponding to the contour thereof. The upper and lower molds 4 are formed by cutting work, similarly to the sixth embodiment or the seventh embodiment. Further, the upper mold 4a by which the lens surface 20 is formed to be convex is formed in the same procedure as that of the sixth embodiment and the lower mold 4b by which the lens surface 20 is formed to be concave is formed in the same procedure as that of the seventh embodiment.

By injection molding by use of the formed upper and lower molds 4, the optical lens 1 is formed, of which one side is a convex surface, of which the other side is a concave surface, and which has the concave portion 24 on the optical axis of both lens surfaces 20. Here, similarly to the sixth embodiment or the seventh embodiment, the respective concave portions 25 are arranged on the optical axis of both lens surfaces 20, and the diameter of the base in the lens surface 20 is in the range of 0.5 to 5 µm. Therefore, the eccentricity between both lens surfaces 20 can be measured with ease and with high precision by a microscope. Further, as the relative position between the upper and lower molds 4 is adjusted in the horizontal direction based on the measurement result, the optical lens 1 which satisfies a permissible value of the eccentricity can be formed.

In the sixth to the eighth embodiments, the lens surface 20 is formed to have a rotation-symmetry shape centered on the top portion 21 or the bottom portion 22. However, even when the lens surface 20 is formed to have an elliptical shape or asymmetric shape, and if the concave portion 25 is formed on the optical axis of each lens surface 20, the eccentricity amount can be easily calculated from the positional deviation between the respective concave portions 25, similarly to the respective above-described embodiments.

Figure 25:
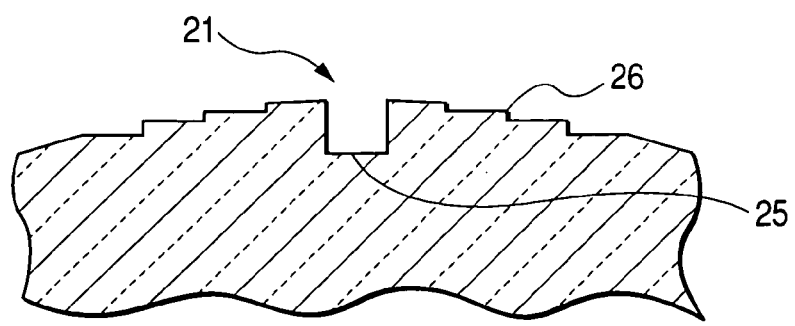
FIG. 25 is an enlarged sectional view in the vicinity of a concave portion in the ninth embodiment.

Next, the ninth embodiment will be described. Similarly to the sixth embodiment, the optical lens 1 in the present embodiment includes the concave portion 25 in each of the top portions 21 of both lens surfaces 20, and the shape in the vicinity of the concave portion 25 is different from that of the sixth embodiment. FIG. 25 is an enlarged sectional view in the vicinity of the concave portion 25 of the optical lens 1 in the present embodiment, and FIG. 26 is an enlarged plan view in the vicinity of the concave portion 25.

Figure 26:
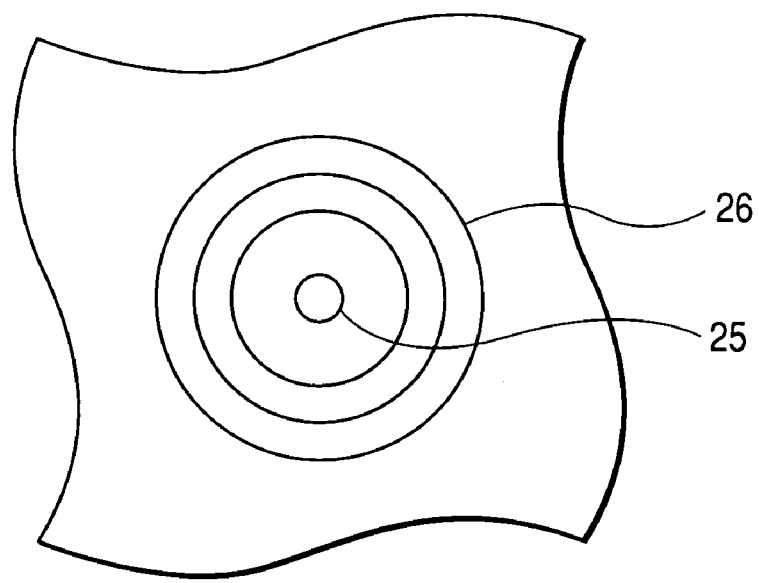
FIG. 26 is an enlarged plan view in the vicinity of the concave portion.

As shown in FIGS. 25 and 26, the optical lens 1 in the present embodiment includes a concentrically stepped portion 26 centered on the top portion 21 of the lens surface 20 on which the concave portion 25 is formed. The stepped portion 26 is formed in the range where it can be observed simultaneously with the concave portion 25 when the lens surface 20 is seen through a microscope for measurement of eccentricity. The concave portion 25, which is the base point of the eccentricity measurement of both lens surfaces 20 of the formed optical lens 1, has the detectable size when it is seen through a microscope. However, when there exists a microscopic scratch or foreign matter in the vicinity of the concave portion 25, it is likely to confuse the scratch or the foreign matter with the concave portion 25. In the present embodiment, since the concave portion 25 is formed in the center of the stepped portion 26, the concave portion can easily be detected without being confused with a scratch or the like.

In addition, when measured by using a differential interference microscope, the stepped portion 26 is formed in a ring shape centered on the top portion 21. Therefore, even though the difference in size between the stepped portions is set to about 10 µm, the stepped portion 26 can be clearly identified. Further, the stepped portion 26 is a concentric step centered on the top portion 21 of the lens surface 20, and the mold 4 can be formed by rotation cutting work. Therefore, the stepped portion 26 is easily manufactured by cutting work.

Figure 27:
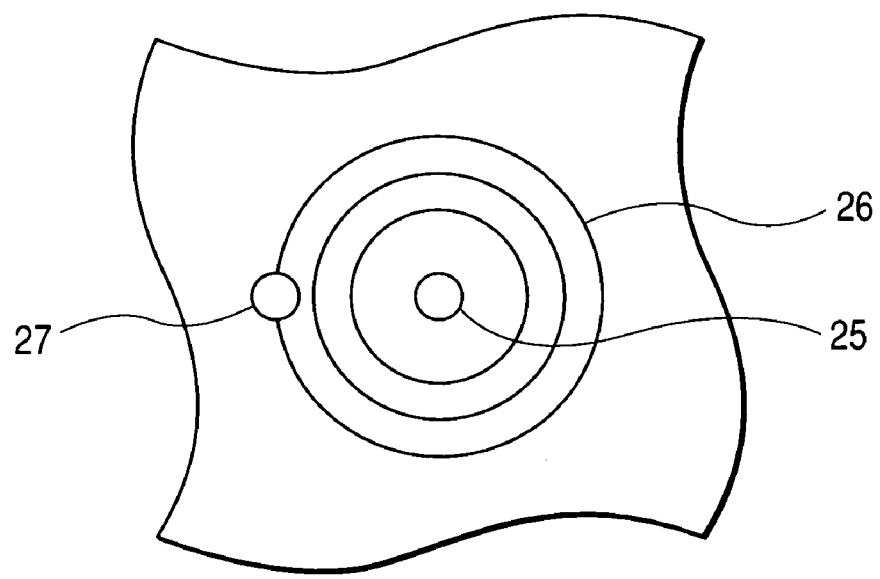
FIG. 27 is a diagram illustrating another embodiment in FIG. 25.

In addition, as an orientation concave portion is formed at the position where both lens surfaces 20 are opposed to each other in the vicinity of the concave portion 25, the orientation in the formed mold of the optical lens 1 can be easily known. For example, as shown in FIG. 27, the orientation concave portion 27 is formed only in the direction of a gate into which molten resin is injected, so that the flow direction of the molten resin from the concave portion 25 formed in the rotation center of the lens surface 20 can be known. Accordingly, the eccentricity amount with respect to the flow direction of molten resin and the orthogonal direction thereto can be measured, which is useful in evaluating the eccentricity between the lens surfaces 20. In addition, if the orientation concave portion 27 is provided on the step of the stepped portion 26, the orientation concave portion 27 and the concave portion 25 can be easily distinguished.

Up to now, the embodiments of the present invention have been described, but the application of the present invention is not limited to these embodiments. Various applications can be made within the scope without departing from the spirit of the present invention. For example, if the shape of the convex portion 23 or the concave portion 25 is the shape which can easily specify the position on the optical axis of the lens surface 20, any shape may be used, without being limited to the present embodiment.

According to the optical lens of the present invention, each lens surface of the lens portion has the convex portion of a small projection centered on the optical axis thereof, and so the amount of eccentricity between both lens surfaces is obtained from the positional deviation between the respective convex portions. Compared to the conventional example, therefore, the amount of eccentricity can be easily obtained, and a manufacturing cost can be reduced.

According to the optical lens of the invention, each lens surface of the lens portion has the concave portion of a small hole centered on the optical axis thereof, and the concave portion, of which the base has a diameter in the range of 0.5 to 5 μm, has a substantially cylindrical shape or a substantially conical shape. Therefore, an eccentricity amount can be calculated with ease and with high precision from the positional deviation between the respective concave portions, and productivity and product precision can be enhanced.

According to the optical lens of the invention, the convex portion is formed in a cross shape, and the intersection of the cross shape is arranged on the optical axis of the lens surface. Therefore, two grooves may be formed on the mold so as to correspond to the convex portion, and manufacture thereof is easily performed by cutting work.

According to the optical lens of the invention, each lens surface of the lens portion has the concentric stepped portion centered on the concave portion in the vicinity of the concave portion or centered on the convex portion in the vicinity of the convex portion. Therefore, even when a minute foreign matter or a minute scratch exists in the vicinity of the concave portion or the convex portion, an eccentricity can be correctly measured without being confused.

According to the optical lens of the invention, each lens surface of the lens portion has an orientation concave portion or an orientation convex portion at the position corresponding thereto in the vicinity of the concave portion or the convex portion. Therefore, the position of a gate can be confirmed by the orientation concave portion or the orientation convex portion, and the amount of eccentricity with respect to the flow direction of molten resin and the direction orthogonal thereto can be easily measured.

According to the optical lens of the invention, the plate-like edge portion is formed at the circumferential edge of the lens portion, the plurality of circumferential-edge convex portions are formed at the corresponding positions on both surfaces of the edge portion, and the positional deviation between the respective convex portions is calculated from the positional deviation between the plurality of circumferential-edge convex portions corresponding to each other. Therefore, the positional deviation between the respective convex portions can be measured with high precision.

According to the method of manufacturing the optical lens of the invention, when the lens surface molding portion corresponding to the lens surface is formed on each of the upper and lower molds, the small hole for the convex portion is formed to have the depth which is approximately less than four times the used length, centered on the position corresponding to the optical axis of the lens surface. Then, the lens portion is formed by injection molding by use of the upper and lower molds on which the lens surface molding portion is formed. Based on the positional deviation between the respective convex portions provided on the optical axis of both lens surfaces, the relative position between the upper and lower molds is adjusted. Therefore, the optical lens having no eccentricity can be formed.

According to the method of manufacturing the optical lens of the invention, the lens surface molding portion which is constituted by a convex surface or a concave surface corresponding to the lens surface is formed in each of the upper and lower molds. The lens surface molding portion has the small hole for the concave portion having a substantially cylindrical shape or a substantially conical shape, of which the base has a diameter in the range of 0.5 to 5 μm, the small hole being centered on the position corresponding to the optical axis of the lens surface. Then, the lens portion is formed by injection molding by use of the upper and lower molds on which the lens surface molding portion is formed. Based on the positional deviation between the respective convex portions provided on the optical axis of both lens surfaces, the relative position between the upper and lower molds is adjusted. Therefore, the optical lens having no eccentricity can be formed.

The invention claimed is:

1. An optical lens comprising:
   a lens portion having a lens surface on a first and second side;
   a first projection that is convex with respect to the first side lens surface and centered on the optical axis of the first side lens surface, the first projection being the only projection on the first side; and
   a second projection that is convex with respect to the second side lens surface and centered on the optical axis of the second side lens surface, the second projection being the only projection on the second side,
   wherein the first and second projections have a height that is approximately less than four times the used wavelength so as not to have an effect on an optical characteristic of the lens portion,
   wherein the first and second projections are formed in a cross shape and the intersection of the cross shape is arranged on the optical axis of the lens surface.

2. The optical lens according to claim 1, wherein the cross shape includes a first elongated projection that crosses a second elongated projection.

* * * * *